US006625715B1

(12) United States Patent
Mathews

(10) Patent No.: US 6,625,715 B1
(45) Date of Patent: Sep. 23, 2003

(54) SYSTEM AND METHOD FOR TRANSLATION BUFFER ACCOMMODATING MULTIPLE PAGE SIZES

(75) Inventor: Gregory S. Mathews, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,607

(22) Filed: Dec. 30, 1999

(51) Int. Cl.[7] .............................................. G06F 12/04
(52) U.S. Cl. ........................ 711/207; 711/205; 711/216
(58) Field of Search ............................ 711/1, 118, 122, 711/202, 203, 206, 207, 205, 209, 212, 216

(56) References Cited

U.S. PATENT DOCUMENTS

| 5,282,274 A | * | 1/1994 | Liu ............................. 711/206 |
| 5,446,854 A | * | 8/1995 | Khalidi et al. ................. 711/1 |
| 5,479,627 A | * | 12/1995 | Khalidi et al. .............. 711/205 |
| 5,526,504 A | * | 6/1996 | Hsu et al. .................... 711/207 |
| 5,918,245 A | * | 6/1999 | Yung ........................... 711/122 |
| 5,956,756 A | * | 9/1999 | Khalidi et al. .............. 711/207 |
| 6,079,004 A | * | 6/2000 | Liedtke ....................... 711/207 |
| 6,157,986 A | * | 12/2000 | Witt ............................ 711/118 |

* cited by examiner

Primary Examiner—David Hudspeth
Assistant Examiner—Fred F. Tzeng
(74) Attorney, Agent, or Firm—Schwegman, Lundberg, Woessner & Kluth, P.A.

(57) ABSTRACT

A translation buffer is described which can translate virtual addresses to physical addresses wherein the virtual addresses have varying page sizes. The translation buffer includes a decoder to generate a hashed index, the index identifying an entry into two arrays. The first of the two arrays identifies a corresponding physical page address and the other array identifies a corresponding variable page address that in comparison to a variable portion of the virtual address, will indicate whether the entry in the first array has a matching entry. If the first array identifies a matching physical page address, then the physical page address is combined with the offset of the virtual address to yield a physical address translation of the virtual address.

8 Claims, 12 Drawing Sheets

SYSTEM AND METHOD FOR TRANSLATION BUFFER ACCOMMODATING MULTIPLE PAGE SIZES

TECHNICAL FIELD OF THE INVENTION

The present invention relates generally to computer systems having virtual memory addressing, and in particular the present invention relates to such computer systems have a translation lookaside buffer (TLB) or similar cache for use with virtual memory addressing.

BACKGROUND OF THE INVENTION

Virtual memory addressing is a common strategy used to permit computer systems to have more addressable memory than the actual physical memory installed within a given computer system. Data is stored on a storage device such as a hard disk drive and is loaded into physical memory as needed typically on a memory page-by-memory page basis, where a memory page is a predetermined amount of contiguous memory. Computer systems having virtual memory addressing must translate a given virtual memory address to a physical memory address that temporarily corresponds to the virtual address.

In many such computer systems, translation is accomplished via a translation lookaside buffer (TLB), also known by those skilled in the art as a TC (translation cache). The TLB is a cache located preferably near the processor of the computer system in order to improve the access speed and also holds virtual page-to-physical page mappings most recently used by the processor. The TLB entries may be cached entries from a page table or translations created and/or inserted by the operating system. The translation of virtual to physical addresses commonly are a critical path in computer performance. Conventional TLB organizations well-known to those skilled in the art include direct-mapping in which an entry can appear in the TLB in only one position, fully associative mapping in which an entry can be placed anywhere in the TLB, and set-associative in which an entry can be placed in a restricted set of places in the TLB where a set is a group of entries in the cache and an entry can be placed anywhere within the set.

Fully associative TLBs conventionally include a Content Addressable Memory (CAM) array and a Random Access Memory (RAM) array. CAM, also known as "associative memory" is a kind of storage device which includes comparison logic with each bit of storage. A data value is broadcast to all words of storage and compared with the values there. Words which match are flagged in some way. Subsequent operations can then work on flagged words and/or data linked to those flagged words, e.g. read them out one at a time or write to certain bit positions in all of them.

Set-associative TLBs conventionally include decoders, RAM arrays, and comparators. Part of the virtual address is used by the decoder to determine which entries in the RAM array may contain a corresponding physical address translation. The remainder of the virtual address is typically used along with a tag stored in the RAM array (each RAM array entry has a corresponding tag) by the comparator to determine a specific entry to be used for translation. Set-associative TLBs tend to be faster to access than fully associative TLBs due to the use of decoders rather than CAM arrays.

Conventional TLBs are designed to work with a fixed page size, such as a 4K (1K=1024 bytes) page size, a 16K page size, or a 256K page size. This is less than optimal because memory space on conventional personal computers (PCS) is designed in a manner wherein different address ranges have differing page granularity requirements. For example, on a PC, physical memory space between addresses 640K and 1M (1M=2^20 bytes) need 4K–8K granularity to support partitions for read-only memories (ROMs), hard disk interfaces, graphics interfaces, etc., but physical memory space below 640K and above 1M is random-access memory (RAM), which would be more efficiently mapped with larger page sizes.

A conventional solution is to use multiple TLBs in which at least one TLB is implemented for each page size of addressable memory space. For example, one TLB is implemented for memory space that is addressed via 4K page sizes and another TLB is implemented for memory space that is addressed via 16K page sizes. This is problematic because all TLBs must be referenced for each virtual address (slower than referencing a single TLB), the method allows creation of multiple (overlapping) entries representing the same virtual address, and the Operating System (OS) is limited to a small set of possible page sizes.

Another conventional solution is to implement one TLB using a page size of the smallest page size needed, such as 4K in the above example of a conventional microprocessor. However, this is problematic in that many more entries in the TLB will be needed to describe the portions of memory that are addressed in larger page sizes. For example, eight entries would be needed in a TLB to describe every 32K page of memory if the TLB uses a page size of 4K. If the number of entries in the TLB is increased to accommodate the requirement of more entries, this results in slower performance because searching a larger TLB is slower than searching a smaller TLB. If the number of entries in the TLB is not increased, then the number of "misses" will increase (the case in which a given virtual address has no corresponding entry in the TLB), thus causing hardware or the OS to spend a significant number of cycles retrieving the missing translation before program execution can resume. Because the translation of virtual to physical addresses are a bottle-neck in the speed of computers, it is critical that the translation be accomplished quickly.

Therefore, a need exists for a single fast TLB that can accommodate multiple page sizes quickly.

SUMMARY OF THE INVENTION

The system identifies virtual addresses as including three portions; a virtual fixed page address in the upper bits of the address word that is always used for identification of the page; an offset address in the lower bits of the address word that is always used for identification of the page offset; and a variable page address between the virtual fixed page address and the offset, that identifies either page address or offset address, depending on the size of the page corresponding to the virtual address word.

In one embodiment of a method of the present invention, the system receives a virtual address and page size bias for the virtual address and outputs a corresponding physical address. The page size bias is used in the look-up of the physical address. During intermediate stages of the virtual to physical address translation, according to the look-up of the virtual address and page size bias, a page size mask and physical page address are generated. The page size mask indicates what portion of the virtual address describes the address of the virtual page in memory space, and what portion of the address represents an offset within the virtual page. Since the physical page size and virtual page size are the same, the page size mask similarly indicates what portion of the physical page address generated describes the translated virtual page address and is to be used as physical address output and what portion of the physical page address should be masked (because it is not part of the page address) and replaced with the virtual address offset within the page. The final physical address consists of the unmasked portion of the physical page address concatenated with the virtual address offset within the page (the offset within the page is not translated).

In one embodiment of an apparatus, the present invention generates a set of entry selects according to a virtual address and page size bias supplied, generates a physical page address from an entry selected by the entry selects in a first array, generates a virtual address tag from an entry selected by the entry selects in a first array, generates a page size mask from an entry selected by the entry selects in a first array, and generates a match signal from a comparison of the variable page address supplied with a corresponding entry selected by the entry selects in a second array (the match signal is also qualified with a valid bit contained within the second array which indicates whether or not the translation buffer entry selected is valid). A masked physical page address is created by masking-off the lower bits of the generated physical page address with the page size mask so that the address bits which correspond to the portion of the address which represents the offset within the page (as opposed to the portion of the address which represents the address of the page within memory space) are masked off. Then the offset address within the page is created by masking the virtual address with the inverse of the page size mask so that the address bits which correspond to the portion of the address which represents the address of the page within memory space (as opposed to the portion of the address which represents the offset within the page) are masked off. The physical address is then formed by combining the masked physical page address with the offset address within the page.

In another embodiment of an apparatus, a computer system that includes one or more processors, one or more physical memories operating within the processor(s) in which the memories have more than one page size identified to describe the corresponding physical memory, and a translation buffer coupled to the physical memory through an address bus in which the translation buffer receives a virtual address and a page size bias and outputs a physical memory address. The translation buffer includes a decoder that receives the page size bias and a subset of the virtual address input and outputs a set of entry selects. It also includes an array that receives the entry selects from the decoder which contains entries corresponding to those entry selects describing a virtual fixed address tag, a page size mask, a physical memory page address, in which the array outputs the physical address corresponding to the virtual address supplied by combining complementary portions of the physical page address and the virtual page offset address. The array also outputs a virtual fixed address tag which is compared to the virtual fixed address portion of the virtual address supplied to generate a partial match signal. Finally, the translation buffer includes a second array, which contains a variable virtual address tag and a page size mask. The second array inputs the variable page address portion of the virtual address supplied and the entry selects. It then uses the entry selects to select an entry and masks the variable page address supplied with the page size mask of the entry selected such that the portion of the variable page address which corresponds to the offset address within the page is masked and compares this result for equality with the variable virtual address tag of the entry selected, similarly masked with the page size mask of the entry selected, to generate match signal (the match signal is also qualified with a valid bit contained within the second array which indicates whether or not the translation buffer entry selected is valid). A translation match is indicated when both the partial match signal from the first array and the match signal from the second array are true. The translation can be performed in parallel by one or more translation buffers to form a set-associative TLB in which each of the translation buffers is one way of the TLB.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The present invention describes a translation lookaside buffer TLB, or similar cache, with the ability to translate addresses according to pages of varying sizes, for computer systems having virtual memory addressing. The invention is not particularly limited to a given computer system. Both scalar and vector computer systems, as well-known within the art, can be used in the invention.

Figure 1:
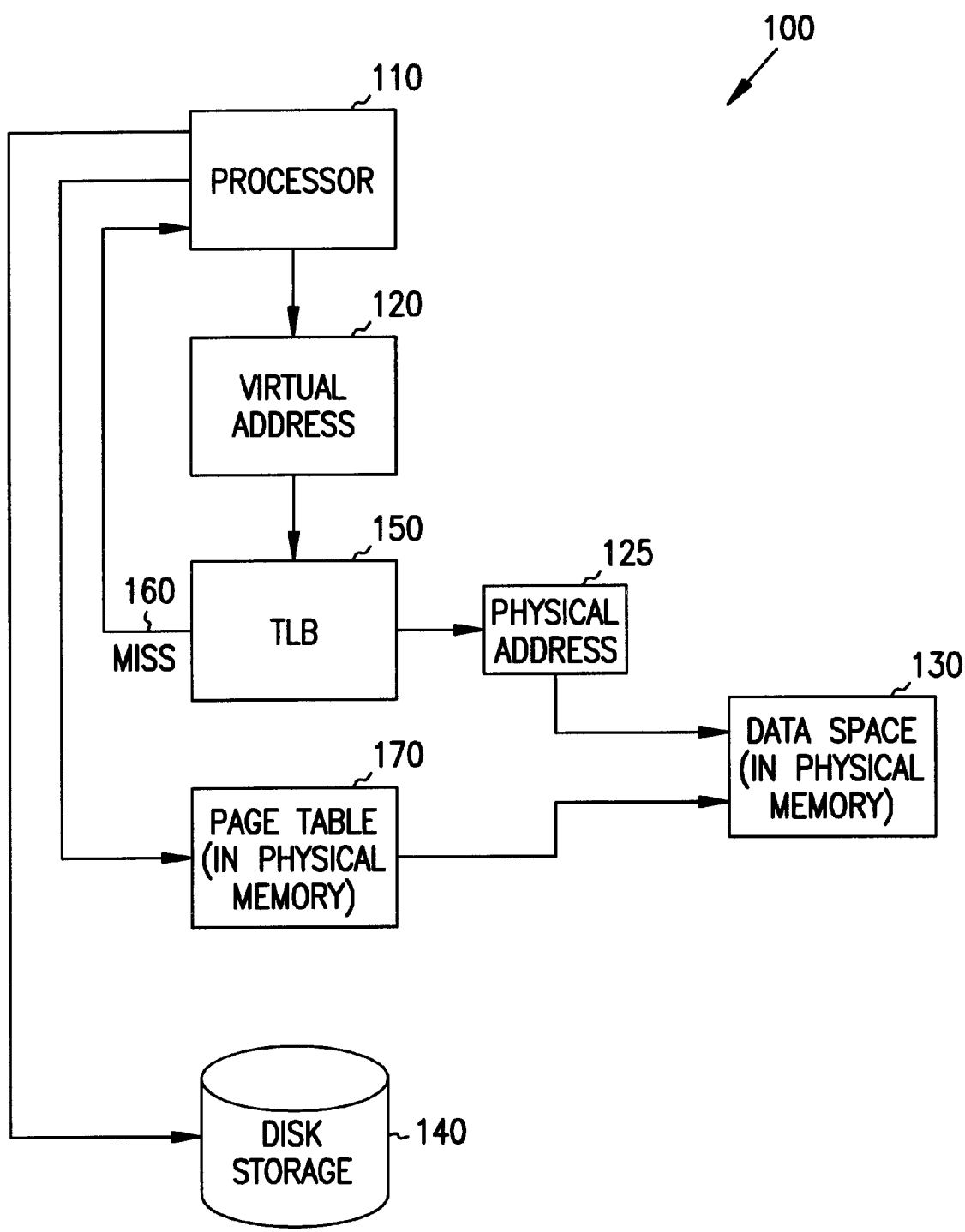
FIG. 1 is a block diagram of a computer system of an embodiment of the invention.

Referring to FIG. 1, a block diagram of a computer system 100 of an embodiment of the invention is shown. There may be more than one processor 110, as commonly found in parallel architectures, for example. The computer system 100 employs virtual memory addressing so that it has more addressable memory than the actual physical memory installed. Processor 110 must therefore translate a given virtual memory address 120 to a physical memory address 125 within data space 130 that resides in physical memory that temporarily corresponds to the virtual address 120. As known within the art, in a virtual memory addressing architecture, data may be stored on a storage device such as hard disk drive (HDD) 140, and loaded into data space 130 located in physical memory as needed.

Virtual to physical address translation is accomplished via translation lookaside buffer (TLB) 150. TLB 150 is a cache located preferably near, or in, processor 110 (in order to enhance access speed) which holds translation table entries recently used by the processor. The translation table entries map virtual memory pages to physical memory pages. A memory page is defined herein as a predetermined amount of contiguous memory space, therefore a given memory address refers to a location within a particular memory page. The translation table entries permit conversion of virtual addresses such as virtual address 120 to physical addresses within data space 130 that is located within physical memory. That is, a virtual address 120 corresponding to a location within a virtual page mapped to a physical page is convertible to a physical address 125 corresponding to a location within that physical page. The invention can include other types of caches than TLB 150. For purposes of this application, the term TLB is inclusive of all such caches.

When the translation table entry required to translate virtual address 120 is within TLB 150, execution by processor 110 of a computation utilizing address 120 proceeds very quickly. The physical address 125 within data space 130 located within physical memory corresponding to virtual address 120 is obtained via TLB 150, and the physical address within data space 130 located within physical memory is accessed by processor 110.

However, when the translation table entry required to translate the desired virtual address 120 is not found within TLB 150, execution by processor 110 of a computation utilizing the address 120 slows considerably. TLB miss 160 is generated, and may be used to cause an interrupt to the OS, or may be used to cause a hardware page table search.

In the event that a hardware page table search is initiated, hardware will search for the translation corresponding to the virtual address 120 which missed the TLB 150, in the page table 170. If it finds the missing translation, it will install the translation in the TLB 150, and the program will be resumed. If the hardware fails to find a translation corresponding to the virtual address 120 which missed the TLB 150 in the page table 170, then an interrupt to the OS will be generated.

If an interrupt was sent to the OS either due to a TLB miss or a failed hardware page table search, then the OS will be required to provide the missing TLB entry. This may entail the OS searching the page table 170 (if there was no hardware search and the entry was contained within the page table 170), creating a new entry in the page table 170 (if the page table 170 did not contain the missing entry), and/or installing a new entry in the TLB (a new TLB entry may be created/installed by the OS which is not placed in the page table 170), before the program can resume.

Due to the size of the page table 170, it may be desirable/necessary to maintain only a subset of the total number of entries within the physical memory, with the remainder stored elsewhere (like in disk storage 140). Similarly, it may be desirable/necessary to maintain only a subset of the physical memory space in physical memory with the remainder stored elsewhere (like in disk storage 140). In these cases, the OS will be required to swap data from/to the disk/physical memory on an as-needed basis and to mark the TLB entries and page table entries which correspond to those physical pages with respect to their "presence" or "non-presence" in physical memory.

As has been described, one computer system used in the invention includes both a TLB and a page table. However, the invention is not so limited. For example, a computer system may only have a TLB, and no page table. The generation of a TLB miss therefore always requires the operating system to provide translations. Those of ordinary skill within the art will appreciate, however, that embodiments of the invention, as will be described, are most advantageous when all accessed pages (and their corresponding page table entries) are present in physical memory.

Figure 2:
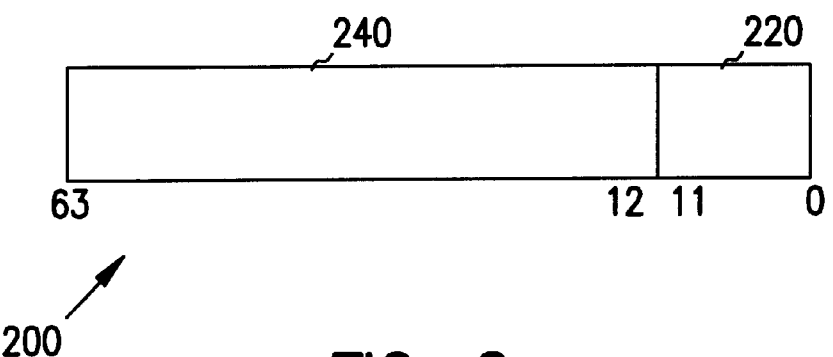
FIG. 2 is a block diagram of a virtual address word using a 4K page size.

FIG. 2 is a block diagram of a virtual address word 200 using a 4K page size. The 64 bit word 200 contains a page offset address 220 that is twelve bits in length to represent a 4K page. The remaining portion of virtual address word 200 is the virtual page address 240 that is 52 bits in length representing 2^52 of virtual pages. In virtual to physical address translation, the virtual page address 240 is translated to physical a page address, and the page offset address 220 is unchanged.

Figure 3:
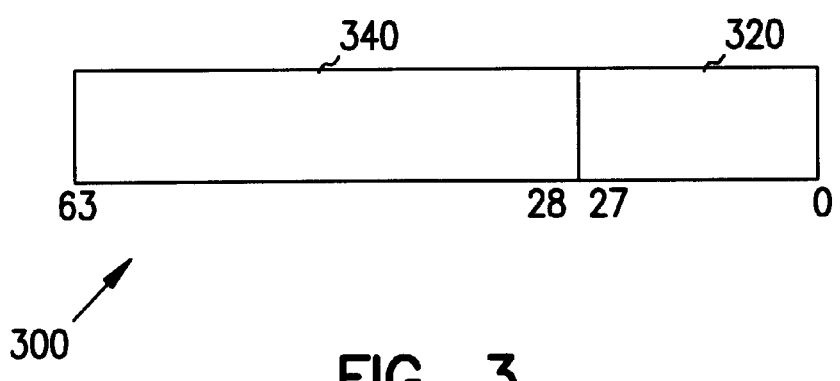
FIG. 3 is a block diagram of a virtual address word using a 256K page size.

FIG. 3 is a block diagram of a virtual address word 300 using a 256 M page size. The 64 bit word 300 contains a page offset 320 that is twenty-eight bits in length to represent a 256M page. The remaining portion of virtual address word 300 is the virtual page address 340 that is 36 bits in length representing 2^36 virtual pages.

Figure 4:
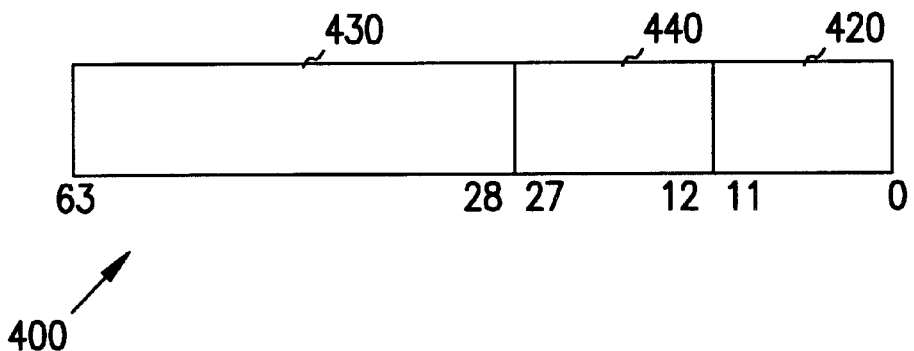
FIG. 4 is a block diagram of a virtual address word using a variable page size ranging from a 4K page size to a 256K page size.

FIG. 4 is a block diagram of a virtual address word 400 using a variable page size ranging from a 4K page size to a 256M page size. The 64-bit word 400 contains a page offset address 420, a variable page address 440, and a virtual fixed page address 430.

The page offset 420 is the portion of the virtual address word 400 that describes the offset of the address within a page. The size of the page offset 420 is the size of smallest page size implemented. For example, between FIG. 2 and FIG. 3, the smallest page size implemented is the 4K page in FIG. 2 in which the page offset address 220 is described by bits 0 through 11. Therefore, the page offset 420 is bits 0 through 11.

The virtual fixed page address 430 is a set of bits in the upper portion of the virtual address that is invariably used to describe the page address. This is the portion of the virtual address 400 that will never be used to describe the offset, even when the page size of the virtual address is the maximum size implemented. For example, between FIG. 2 and FIG. 3, the maximum page size implemented is a 256M page in FIG. 3 in which the virtual page address 340 is described by bits 28 through 63. Therefore, the virtual fixed page address 430 is bits 28 through 63.

The variable page address 440 is a set of bits that describes the portion of the virtual address 400 that may be used as the lower portion of the virtual page address, the page offset, or a combination of both, depending on the page size of the virtual address. In other words, the variable page address 440 describes the portion of the virtual address 400 that spans the range from the largest page size to the smallest page size implemented. More specifically, when the virtual address 400 translates to a physical address using the smallest page size that is implemented, all of the bits of the variable page address 440, in conjunction with the virtual fixed page address 430, describe the virtual page address. When the virtual address 400 translates to a physical address using the largest page size that is implemented, all of the bits of the variable page address 440, in conjunction with the page offset address 420, describe the offset within the page. For example, between FIG. 2 and FIG. 3, the smallest page size implemented is the 4K page in FIG. 2, in which the page offset address 220 is described by bits 0 through 11 and the maximum page size implemented is the 256K page in FIG. 3, in which the virtual page address 340 is described by bits 28 through 63. Therefore, for the case in which the smallest page size supported was 4K and the largest page size supported was 256K, the variable page address 440 would be the portion of the virtual address 400 that describes either page address or page offset depending upon the page size of the virtual address being translated, or bits 12 through 27.

Figure 5:
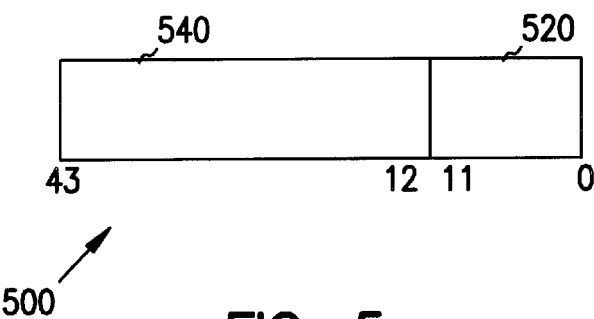
FIG. 5 is a block diagram of a physical address word using a 4K page size.

FIG. 5 is a block diagram of a 44-bit physical address word using 4K page size. The 44 bit word contains a page offset 520 that is twelve bits in length to represent a 4K page. The remaining portion of physical address word 500 is the physical page address 540 that is 32 bits in length representing 2^32 physical pages. In virtual to physical address translation, the virtual page address is translated to physical page address 540, and the physical page offset address 520 is derived unchanged from the virtual page offset address.

Conventionally, a TLB 150 in FIG. 1 in computer system 100 will use only one page size, such as a 4K page size as in FIG. 2 or a 256K page size as in FIG. 3 to translate a virtual address word 200 as in FIG. 2 or virtual address word 300 as in FIG. 3 into a physical address word 500 as in FIG. 5 or require a TLB for each page size supported. However, the inventive system overcomes this problem by enabling a single TLB to implement two or more page sizes.

Figure 6:
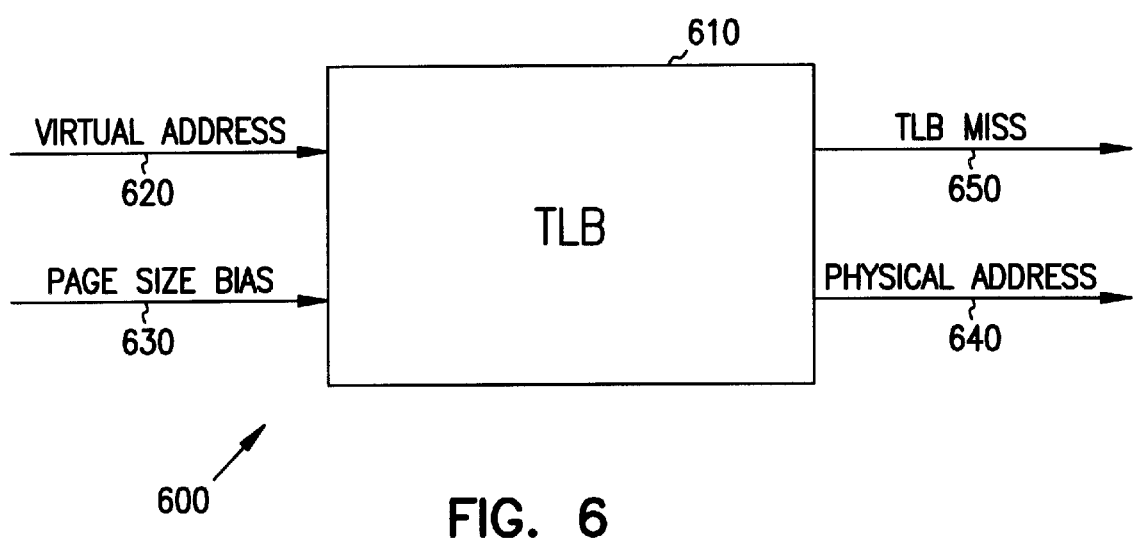
FIG. 6 is a block diagram of one embodiment of the present invention.

FIG. 6 is a block diagram of one embodiment of the present invention. System 600 includes a TLB 610 that accepts an input virtual address 620 and an input indication of a page size bias 630. The TLB translates the input virtual address 620 into an output physical address 640 if the input virtual address 620 matched an entry in the TLB 610, otherwise, an indication of a TLB miss 650 is transmitted.

A more detailed description of TLB 610 is described with reference to FIGS. 7–10.

Figure 7:
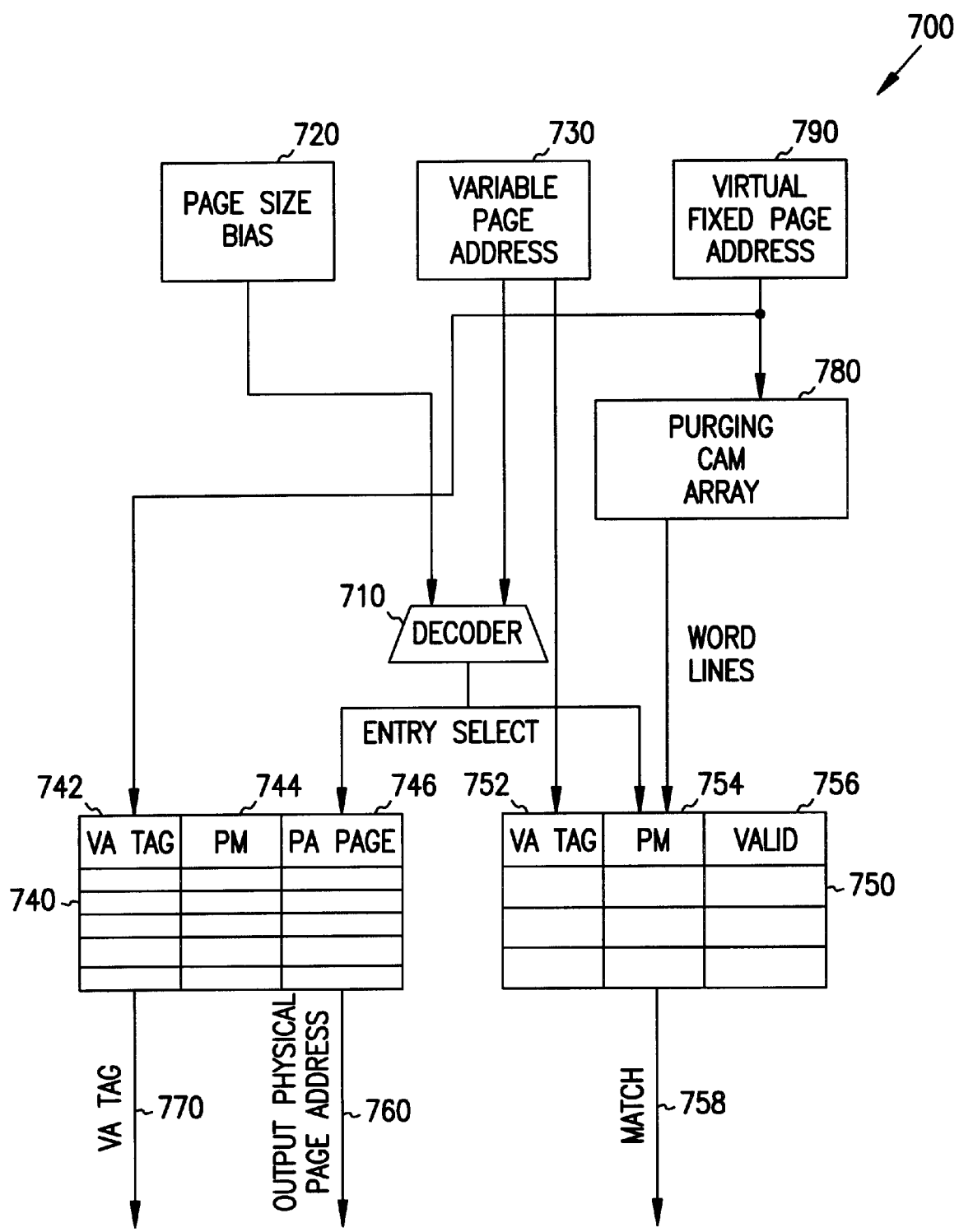
FIG. 7 is a block diagram of one embodiment of translation buffer of the present invention.

FIG. 7 is a block diagram of one embodiment of the translation buffer 700 of the present invention. The decoder 710 receives the page size bias 720, which corresponds to TLB 610 that accepts an input indication of a page size bias 630. The page size bias 720 is a set of bits that is as wide as minimally necessary to describe the range from the smallest page size to the largest page size that the translation buffer will support. In one embodiment, the page size bias will be 6 bits wide in order to describe seven page sizes ranging from 4K as in virtual address word 200 in FIG. 2 to 256K as in virtual address word 300 in FIG. 3. In one embodiment of the page size bias 720, a programmable register is implemented to select the value of the bias. In another embodiment of the page size bias 720, a set of programmable registers are implemented to select the value of the bias based upon the current privilege level (CPL) of the program.

The decoder 710 also receives the variable page address 730, which corresponds to TLB 610 that accepts an input virtual address 620 (of which the variable page address would be a subset). The variable page address 730 is described in detail in FIG. 4 as the variable page address 440. The decoder 710 is discussed in detail below in FIG. 8. The decoder 710 generates and then outputs a wordline entry select (not labeled) that is input to the random access memory (RAM) array 740 and the content addressable memory (CAM) array 750.

The RAM array 740 and the CAM array 750 also both receive the variable page address 730 in addition to the wordline entry select from the decoder 710.

The RAM array 740 is a direct-mapped array that utilizes the wordline entry selects from the decoder 710 to select an entry that describes a physical page which may correspond to the virtual page address. Each entry in the RAM array 740 contains a virtual address tag 742, a page mask 744, and a physical page address 746.

The virtual address tag 742 selected by the entry selects, is output on signals 770 and is then compared with the virtual fixed page address 790 to provide a partial match indication for the entry selected. The page mask 744, the physical page address 746, and the variable page address 730 are used to generate the output physical page address 760 for the entry selected.

The CAM array 750 also utilizes the wordline entry selects from the decoder 710 to select the "match" output from the CAM array entry which corresponds to the RAM array entry selected. Thus, the CAM array 750 is used to determine, in part, if the entry selected in the RAM array 740 matches the virtual page. All of the virtual page address that is required to describe the smallest implemented page size is described between the RAM and the CAM arrays.

The virtual address tag 742 describes the virtual fixed page address 430 of FIG. 4, which is a set of bits in the upper portion of the virtual address that is invariably used to describe the page address. This is the portion of the virtual address 400 that will never be used to describe the offset, even when the page size of the virtual address is the maximum size implemented. For example, between FIG. 2 and FIG. 3, the maximum page size implemented is a 256M page in FIG. 3 in which the virtual page address 340 is described by bits 28 through 63. Therefore, if the maximum page size implemented is 256M, the virtual fixed page address 430 is bits 28 through 63 of the virtual address. The page mask 744 describes how the bits in the variable page address 730 and the physical page address 746 will be used to generate the output physical page address 760. In one embodiment, the width of the page mask 744 will be equally as wide as the width of the variable page address 730, and each bit in the page mask 744 will identify a corresponding bit in the variable page address 730, that will be used as part of the output physical page address 760 instead of a bit from the physical page address 746 selected. More specifically, in an embodiment in which the page size of the virtual address described by the entry in the RAM array 740, is 4K, as in FIG. 2, and the minimum page size supported is 4K, then each bit of page mask 744 will be set to "0", indicating that all of the output physical page address 760, would come from the physical page address 746 selected. In an embodiment in which the page size of the virtual address described by the entry in the RAM array 740, is 256M, as in FIG. 3, and the minimum page size supported is 4K as in FIG. 4, then bits of the page mask 744 corresponding to virtual address bits 12–27 will be set to "1", indicating that bits 12–27 of the output physical page address 760, would come from the variable page address 730, and the remainder from physical page address 746 selected.

The output physical page address 760 is concatenated with the virtual page offset as described in FIG. 4, to create the complete physical address.

In another embodiment in which not all possible page sizes between the smallest page size implemented and the largest page size implemented are supported, the page mask bits 744 may be reduced and have a many-to-1 correspondence with respect to the variable page address 730, and the physical page address 746. For example, in an embodiment in which the only page sizes of the virtual address supported by the RAM array 740, are 4K and 256M, then a single page mask bit 744 corresponding to virtual address bits 12–27 may be used to indicate whether bits 12–27 of the output physical page address 760, would come from the variable page address 730 or the physical page address 746 selected.

In still another embodiment, the page mask bits have an inverted polarity such that a "0" indicates output physical page address 760 bits coming from the variable page address 730 and a "1" indicating output physical page address 760 bits coming from the physical page address 746 selected.

Each entry in the CAM array 750 includes a virtual address tag 752, a page mask 754, and an indicator of validity of the entry 756. The page mask 754 is typically identical in structure and content to the page mask 744 of the RAM array. The purpose of the page mask 754 is to identify the bits in the virtual address tag 752 that will be masked during comparison to the variable page address 730. The virtual address tag 752 does not contain the same information as virtual address tag 742. Instead, virtual address tag 752 describes the variable page address 440 of FIG. 4. If the virtual address tag 752 selected via the decoder 710 entry selects masked with the page mask 754 selected via the decoder 710 entry selects compares equal to the variable page address 730 masked with the page mask 754 selected via the decoder 710 entry selects, and the valid bit 756 selected via the decoder 710 entry selects is true, then a match signal 758 is set to its true value, otherwise the match line 758 is set to its false value.

The translation buffer 700, also includes a purging CAM array 780. The purging CAM array is used to identify entries in the CAM array 750 for purging. Each entry in the purging CAM array 780 contains a virtual address tag. This virtual address tag contains the same information as virtual address tag 742. During a purge, the purging CAM array receives a virtual fixed page address 790 and a page size or range of addresses to be purged (not shown). If the virtual fixed page address 790 masked with the page size or range supplied, matches an entry in the purging CAM array 780 masked with the page size or range supplied, then a wordline is generated corresponding to each entry matched. Simultaneously, during the purge, the CAM array 750, receives a variable page address 730, and a page size or range of addresses to be purged (not shown). For each CAM array 750 entry for which a corresponding wordline is generated from the purging CAM array 780, and the variable page address 730 masked with the page mask 754 and masked with the page size or range supplied matches the virtual address tag 742 masked with the page mask 754 and masked with the page size or range supplied; the valid bit 756 of that entry will be made false.

Translation buffer 700 can be implemented as a direct-mapped TLB that is includes one translation buffer 700 as described below in FIG. 8, or implemented as a set-associative TLB the includes a plurality of translation buffers 700 as described below in FIG. 9.

Figure 8:
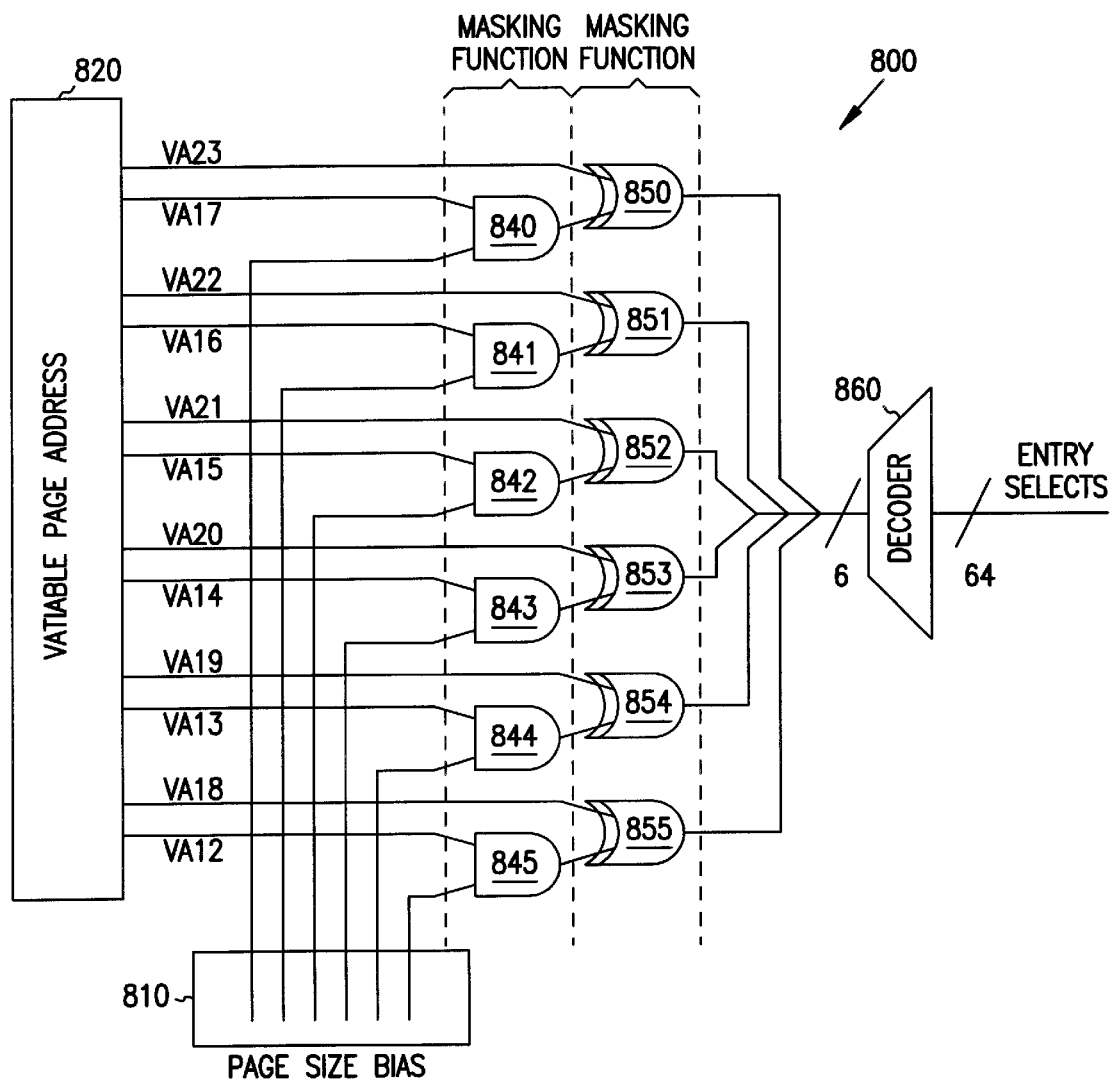
FIG. 8 is a block diagram of a decoder of one embodiment of the present invention.

FIG. 8 is a block diagram of a decoder 800 of one embodiment of the present invention. The decoder 800 includes input for the page size bias 810 and input for the variable page address 820. The page size input 810 corresponds to a subset of the page size bias 720 of FIG. 7 and the variable page address 820 corresponds to a subset of the variable page address 730 of FIG. 7. The decoder 800 uses the page size bias 810 and the variable page address 820 to generate a set of entry selects. These entry selects correspond to the entry selects shown in FIG. 7 used to index the RAM array 740 and CAM array 780. When in operation, first, the page size bias 810 is ANDed with (used to mask) the lower bits of the variable page address 820. Then the AND gate output is XORed with the next higher contiguous set of bits in the variable page address 820, in order to hash the masked variable page address 820. Lastly, the hash output is decoded, resulting in the generation of the entry selects.

In one embodiment shown, the page size bias 810 contains six bits supporting a range of page size biases from 4K to 256K. Page size bias values of 111111, 111110, 111100, 111000, 110000, 100000, and 000000, represent page size biases of 4K, 8K, 16K, 32K, 64K, 128K, and 256K respectively, where for a value of 111110, the AND gate 845 receives a page size bias input of '0'. AND gates 840, 841, 842, 843, 844, and 845 mask the variable page address 820 bits 12–17 with the page size bias 810. The output of the AND gates 840, 841, 842, 843, 844, and 845, are exclusive-ORed by XOR gates 850, 851, 852, 853, 854, and 855 with the next six bits, 18–23, of the variable page address 820 and then decoded via decoder 860, to provide the entry selects into the RAM array 740 and CAM array 780 of FIG. 7.

In another embodiment, the page size bias supports a range of page size biases other than 4K to 256K, where the number of page size bias bits is one less than the number of page size biases supported and the number of page size bias bits does not exceed the number of decoder inputs.

In another embodiment, the page size bias bits do not correspond to consecutive power of 2 page sizes.

In another embodiment, the page size bias values are derived from a set of encoded bits.

In another embodiment, there are fewer page size bias bits than inputs to the decoder 860, and only those variable page address bits for which there is a 1:1 correspondence with page size bias bits are masked with AND gates.

In another embodiment, the variable page address 820 bits input to the masking AND gates are a consecutive series beginning with the least significant bit of the variable page address and providing a 1:1 correspondence of variable page address bit inputs to AND gates.

In conjunction with the TLB look-up (translation of a virtual page address to a physical page address), a cache tag array 930, will generate one or more physical address tags when given a cache index address from address lines 920. One physical address tag will be generated for each way of the cache, as is well known by those skilled in the art. In a four-way embodiment of a cache, cache tag 930 will generate four physical address tags 931, 932, 933, and 934, when accessed. Each physical address tag generated from cache tag 930 is compared to the physical address generated by each of the translation buffers of the TLB and masked with the TLB match signals for determine which way of the cache was hit. For example, in one embodiment in which the cache is a 16K four-way cache, the cache tag array 930, will output four physical address tags 931, 932, 933, and 934 corresponding to a look-up index. Comparators 941, 942, 943, and 944, will compare each way's physical address tag to the physical address output by the TLB 940 for equality. The outputs of the comparators are then ANDed with the output of the virtual fixed page address comparator 914 via AND gates 951, 952, 953, and 954, and ANDed with match line 913 via AND gates 961, 962, 963, and 964, so that a way hit will not be generated in the case that the physical address output of the TLB 940 is equal to one of the four physical address tags, but the physical address output of the TLB is not a correct translation of the virtual address input to the TLB. Note, that the way hit signals must also be gated with a tag valid signal (not shown) indicating whether each entry in the cache tag array 930 is valid. The use-bypass signal 935 is used to block the generation of way hit signals. Lastly, the way hit signals are ORed together using OR gate 970, to generate a cache hit signal 990.

Figure 9:
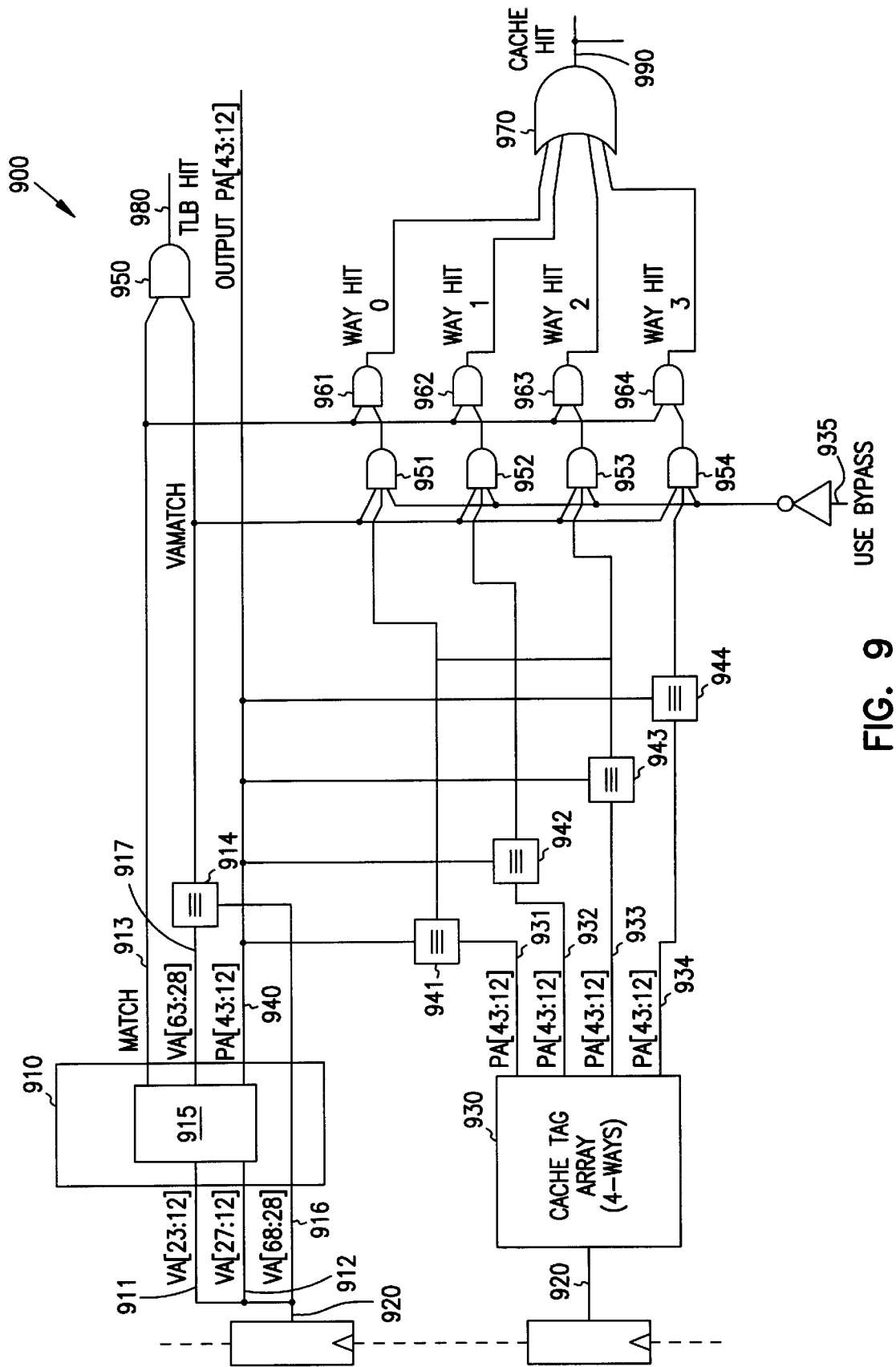
FIG. 9 is a block diagram of a direct-mapped embodiment of the present invention.

FIG. 9 is a block diagram of a direct-mapped embodiment of the present invention. The data cache unit (DCU) 900 implements the invention as a direct-mapped TLB 910, in comparison to FIG. 10 which shows the invention implemented as a set-associative TLB. TLB 910 includes one translation buffer 915 as in translation buffer 700 in FIG. 7. The TLB 910 is a direct-mapped TLB as a result of the singular use of a translation buffer 915.

The DCU 900 uses a TLB to identify a physical page address 940. DCU 900 verifies that the translation buffer 915 of the TLB 910 has output the correct physical page address translation of the virtual page address by verifying that the CAM of the translation buffer indicates a match 913 and by verifying that the virtual fixed page address identified by the RAM array matches the virtual fixed page address. As shown, the TLB can operate in conjunction with a cache 930 to determine if the cache contains data corresponding to the physical address generated, although the TLB can operate without the cache.

DCU 900 verifies that the virtual fixed page address identified by the RAM array 917 matches the virtual fixed page address 916 using comparator 914. More specifically, TLB 910 receives the variable page address 911 and 912 from an address bus 920, similar to TLB 610 in FIG. 6, that receives virtual address 620 in FIG. 6. Within TLB 910, variable page address 911 is transmitted to the decoder 710 in FIG. 7 and variable page address 912 is transmitted to the RAM array 740 and CAM array 750 in FIG. 7. TLB 910 outputs the match from the CAM array 750 to match line 913. TLB 910 also outputs the virtual fixed page address 770 in FIG. 7 from the RAM array 750 as the virtual fixed page address 917 that is compared to the virtual fixed page address 916, by comparator 914. The comparator sets it's output line to high or true if the virtual fixed page address 916 from the address bus 920 is equal to the virtual fixed page address 917 output from the TLB.

The translation buffer 915 has identified a correct virtual to physical page address translation has occurred when the match line 913 indicates a match and the comparison of the virtual fixed page address performed by comparator 914 indicates equality. Therefore, AND gate 950 is used to determine if match line 913 and the output of comparator 914 are both set high or to true (TLB hit is true). The output from AND gate 950 is transmitted to the processor 110 in FIG. 1 on miss line 160 in FIG. 1.

The final outputs of DCU 900 consist of the Physical Page Address 940, and the way hit signals (used by the cache data array to select outputs not shown). Additionally, the DCU 900 outputs a TLB hit (invert to get TLB miss) signal 980, and a cache hit (invert to get cache miss) signal 990 whose use is described in FIG. 1.

Figure 10:
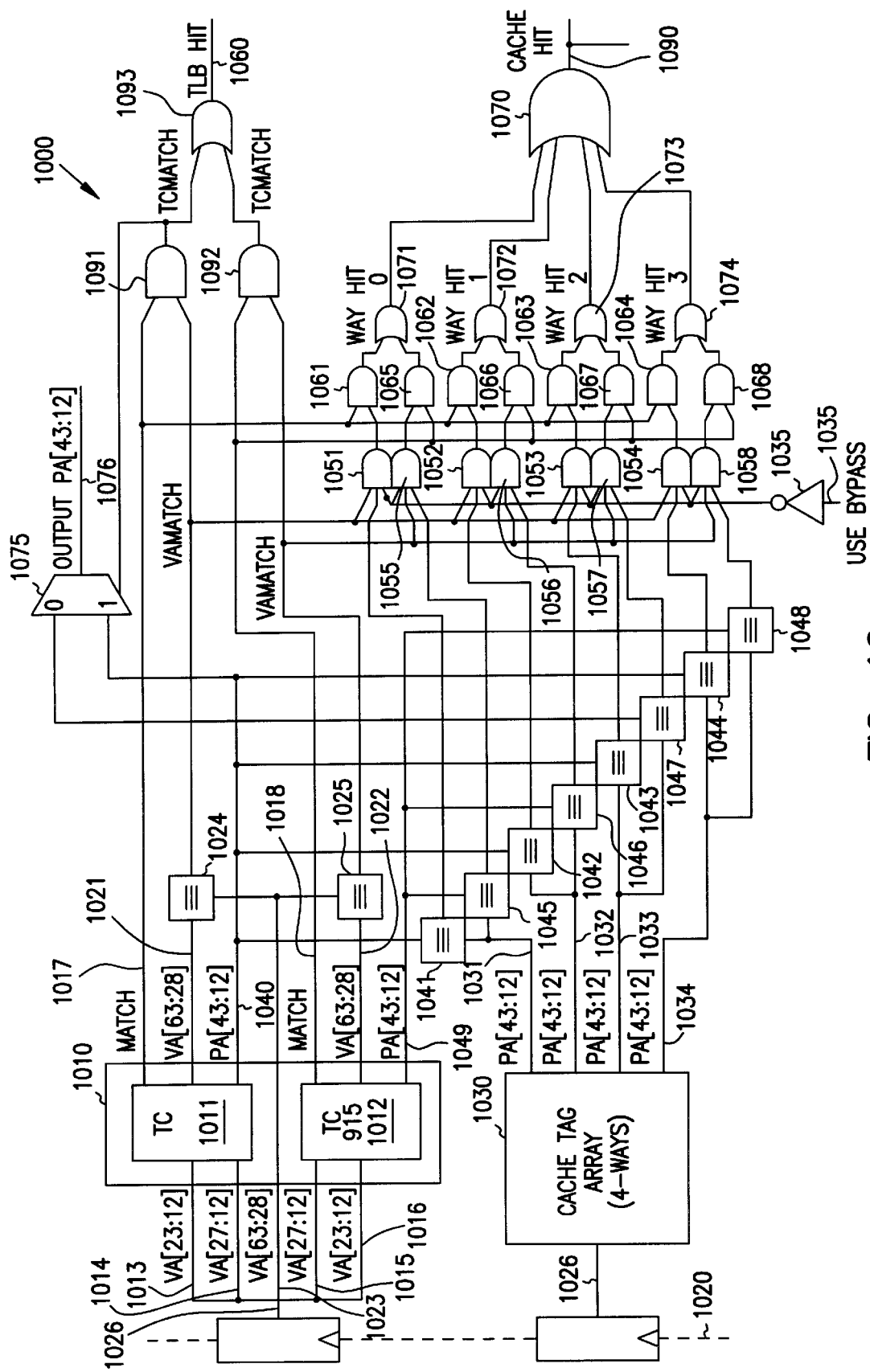
FIG. 10 is a block diagram of a set-associative embodiment of the present invention.

FIG. 10 is a block diagram of a set-associative embodiment of the present invention. The data cache unit (DCU) 1000 implements the invention as a set-associative TLB 1010, in comparison to FIG. 9 which shows the invention implemented as a direct-mapped TLB. TLB 1010 includes two translation buffers 1011 and 1012 as in translation buffer 700 in FIG. 7, operably coupled in parallel. The TLB 1010 is a set-associative TLB as a result of the use of a plurality of translation buffers with orthogonal data sets. The invention is not limited to a two-way set-associative TLB, the invention can also be implemented as a n-way set-associative TLB as is well-known to those skilled in the art, or a direct-mapped TLB as in FIG. 9.

The DCU 1000 uses TLB 1010 to identify the physical page address 1076 which corresponds to a virtual address supplied. DCU 1000 verifies that one of the translation buffers 1011 and 1012 of TLB 1010 has output the correct physical page address translation of the virtual page address by verifying that the CAM arrays of the translation buffers have indicated a match and the corresponding virtual fixed page address supplied by those translation buffer's RAM arrays match the virtual fixed page address supplied 1023. Note that for a given virtual address, a maximum of one of the translation buffers will contain a matching entry as is the case for a typical set-associative device. In addition, for the DCU shown, the TLB is being used in conjunction with cache tag array 1030 to determine if the cache has been hit and if so, which way was hit by the address supplied 1020.

More specifically, TLB 1010 receives the variable page addresses 1013 and 1014, and 1015 and 1016 from an address bus 1020, similar to TLB 610 in FIG. 6, that receives virtual address 620 in FIG. 6. Within TLB 1010, variable page addresses 1013 and 1016 are transmitted to the decoder, as per decoder 710 in FIG. 7, the RAM array as per RAM array 740 in FIG. 7, and the CAM array as per CAM array 750 in FIG. 7 in each of the translation buffers 1011 and 1012. TLB 1010 outputs the matches from each of the CAM arrays as per match line 758 in FIG. 7 from translation buffers 1011 and 1012 to match lines 1017 and 1018. TLB 1010 also outputs the virtual fixed page addresses 1021 and 1022 from the RAM arrays as per the virtual address tag 770 in FIG. 7 that is compared to the virtual fixed page address 1023, as in the virtual fixed page address 430 in FIG. 4, by comparator 1024 and 1025. Comparators 1024 and 1025 set their output lines to high or true if the virtual fixed page address 1023 from the address bus 1020 is equal to the virtual fixed page addresses 1021 and 1022 output from the translation buffers 1011 and 1012 in TLB 1010 respectively.

The translation buffers 1011 and 1012 have identified a correct physical page address when the match lines 1017 and 1018 indicate a match and the corresponding comparison of the virtual fixed page address performed by comparators 1024 and 1025 indicate equality. Therefore, AND gates 1091 and 1092 are used to determine if match lines 1017 and 1018 and the output of comparators 1024 and 1025 are both set high or to true. The output from AND gates 1091 and 1092 are OR'ed together by OR gate 1093 to determine if any of the translation buffers 1011 and 1012 translated the virtual address to a correct physical address, i.e. a TLB hit has occurred. The TLB hit signal 1060 would then be inverted (to indicate TLB miss) and sent to the processor core as for the miss signal 160 sent to processor 110 in FIG. 1. In addition to the TLB hit signal, DCU 1000 also generates a physical address output 1076. This output is obtained by selection of the correct physical address from amongst the physical addresses output by each translation buffer 1040 and 1049 via multiplexer 1075.

In conjunction with the TLB look-up (translation of a virtual page address to a physical page address), a cache tag array 1030, will generate one or more physical address tags when given a cache index address from address lines 1020. One physical address tag will be generated for each way of the cache, as is well known by those skilled in the art. In a four-way embodiment of a cache, cache tag 1030 will generate four physical address tags 1031, 1032, 1033, and 1034, when accessed. Each physical address tag generated from cache tag 1030 is compared to the physical address generated by each of the translation buffers of the TLB and masked with the TLB match signals for determine which way of the cache was hit. For example, in one embodiment in which the cache is a 16K four-way cache, the cache tag array 1030, will output four physical address tags 1031, 1032, 1033, and 1034 corresponding to a look-up index. Comparators 1041, 1042, 1043, and 1044, will compare each way's physical address tag to the physical address output by translation buffer 1011 for equality. Similarly, comparators 1045, 1046, 1047, and 1048, will compare each way's physical address tag to the physical address output by translation buffer 1012 for equality. The output of the comparators 1041, 1042, 1043, and 1044 are then ANDed with the output of the virtual fixed page address comparator 1024 via AND gates 1051, 1052, 1053, and 1054, and ANDed with match line 1017 via AND gates 1061, 1062, 1063, and 1064, so that a way hit will not be generated in the case that the physical address output of the translation buffer 1011 is equal to one of the four physical address tags, but the physical address output of the buffer is not a correct translation of the virtual address input to the buffer. Simultaneously, the same function is applied with respect to the second set (of associativity) of the TLB 1010. The output of the comparators 1045, 1046, 1047, and 1048 are then ANDed with the output of the virtual fixed page address comparator 1025 via AND gates 1055, 1056, 1057, and 1058, and ANDed with match line 1018 via AND gates 1065, 1066, 1067, and 1068, so that a way hit will not be generated in the case that the physical address output of the translation buffer 1012 is equal to one of the four physical address tags, but the physical address output of the buffer is not a correct translation of the virtual address input to the buffer. If the physical address supplied by either translation buffer matches the physical address tag of one of the cache sets or ways, and the physical address supplied is a correct translation of the virtual address supplied 1023, then a way hit is generated for that way of the cache. This function is accomplished by OR'ing the outputs of AND gates 1061, 1062, 1063, and 1064, with the outputs of AND gates 1065, 1066, 1067, and 1068 via OR gates 1071, 1072, 1073, and 1074. Note, that the way hit signals must also be gated with a tag valid signal (not shown) indicating whether each entry in the cache tag array 1030 is valid. The use-bypass signal 1035 is used to block the generation of way hit signals. Lastly, the way hit signals are ORed together using OR gate 1070, to generate a cache hit signal 1090.

The final outputs of DCU 1000 consist of the Physical Page Address 1076, and the way hit signals (used by the cache data array to select outputs not shown). Additionally, the DCU 1000 outputs a TLB hit (invert to get TLB miss) signal 1060, and a cache hit (invert to get cache miss) signal 1090 whose use is described in FIG. 1.

Figure 11:
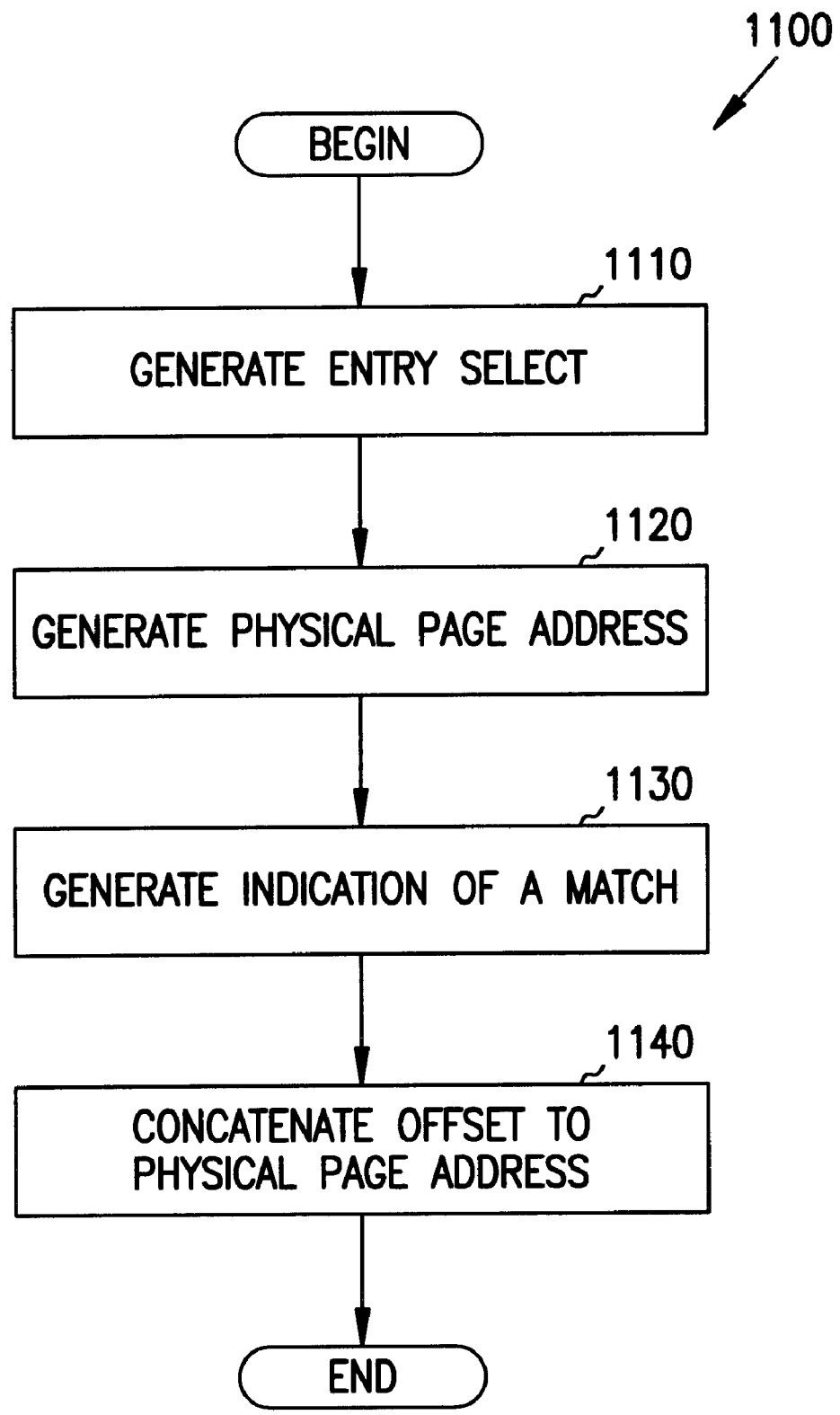
FIG. 11 is a block diagram of one embodiment of a method of translating virtual addresses of varying page sizes to physical addresses.

FIG. 11 is a block diagram of one embodiment of a method 1100 of translating virtual addresses of varying page sizes to physical addresses. Method 1100 begins and thereafter generates an entry select 1110. The entry select is a pointer into two arrays that identifies a set of corresponding entries (one entry in each array), where the first array such as 740 in FIG. 7, maps the virtual page address such as 430 and 440 in FIG. 4, to a physical page address 1120, such as 540 in FIG. 5, and generates a virtual address tag such as 770 in FIG. 7, and the second array, such as 750 in FIG. 7, generates a match indication such as match signal 758 in FIG. 7. The second array generates its match signal if the entry in the second array selected by the entry select is valid (as indicated by a valid bit such as 756 in FIG. 7), and the variable page address such as 730 in FIG. 7 (after being masked by the page size mask, such as 754 in FIG. 7, selected by the entry select) matches the virtual address tag such as 752 in FIG. 7 selected by the entry select (after being masked by the page size mask, such as 754 in FIG. 7, selected by the entry select). A match 1130 is indicated when both the second array indicates a match, and the virtual address tag from the first array is determined to be equal to the virtual fixed page address input such as 790 in FIG. 7. If a match is indicated, then the physical address is generated 1140 by concatenating the physical page address such as 540 in FIG. 5 with the offset from the virtual address, such as 520 in FIG. 5. and the physical address is used to access physical memory, such as 130 in FIG. 1, thereafter method 1100 ends.

Figure 12:
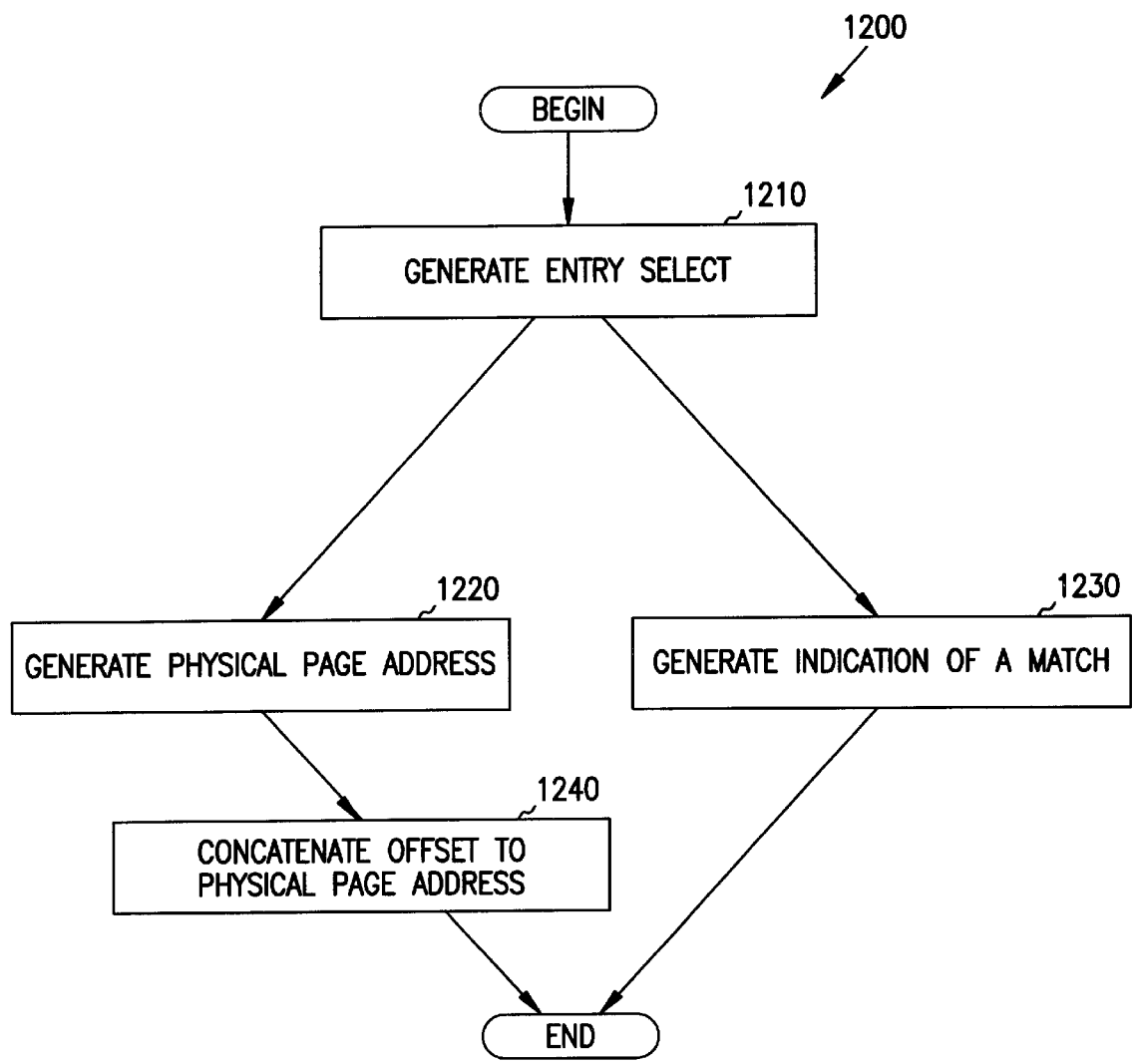
FIG. 12 is a block diagram of another embodiment of a method of translating virtual addresses of varying page sizes to physical addresses.

FIG. 12 is a block diagram of another embodiment of a method 1200 of translating virtual addresses of varying page sizes to physical addresses. Method 1200 performs the same function as method 1100, except that the generation of a physical page address 1220 and the generation of an indication of a match occur in parallel 1230. The method begins, and thereafter, an entry select is generated 1210, as in action 1110 in FIG. 11. Thereafter, a physical page address is generated 1220, and the physical address is generated by concatenating the physical page address with the offset from the virtual address as in actions 1120 and 1140 in FIG. 11. In parallel to the physical page address and physical address generation, an indication of a match is generated as in action 1130 in FIG. 11. The physical address is used to access physical memory such as 130 in FIG. 1, but if a match is not indicated, then the physical memory access would have to be blocked or aborted depending upon the type of memory being accessed and the type of access being performed (a load from speculatable memory could be started and aborted, a store or access to non-speculatable memory would have to be blocked/not started). Thereafter method 1200 ends.

Figure 13:
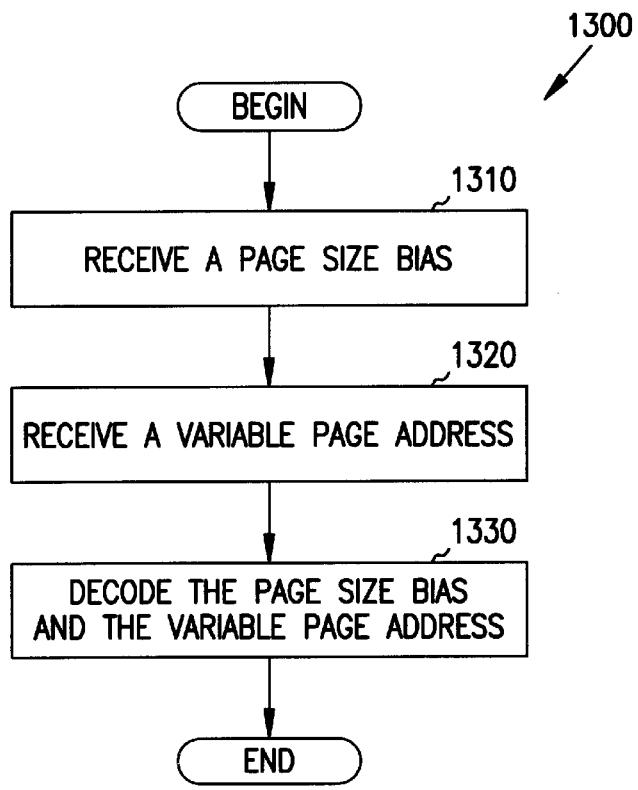
FIG. 13 is a block diagram of one embodiment of a method of generating a wordline selection in translating virtual addresses of varying page sizes to physical addresses.

FIG. 13 is a block diagram of one embodiment of a method 1300 of generating an entry select as in action 1110 in FIG. 11, in the translation of virtual addresses of varying page sizes to physical addresses. Method 1300 begins and an indication of a page size bias associated with the virtual address is received 1310. Thereafter, the variable portion of the virtual page address, such as 440 in FIG. 4, is taken from the virtual address, such as 400 in FIG. 4, and received 1320.

Afterward, the variable page address and the page size bias are decoded 1330, resulting in the generation of an entry select that will be used to identify a physical page address, as in action 1120 of FIG. 11 or action 1220 in FIG. 12 and the generation of an indication of a match as in action 1130 in FIG. 11. Thereafter, method 1300 ends. In another embodiment, action 1310 is performed after action 1320, but before action 1330.

Figure 14:
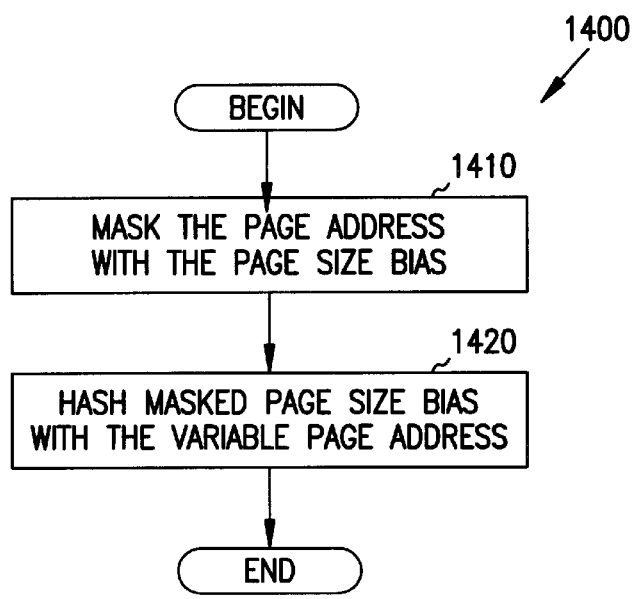
FIG. 14 is a block diagram of one embodiment of a method of decoding a variable page address with a page size in generating a wordline selection in translating virtual addresses of varying page sizes to physical addresses.

FIG. 14 is a block diagram of one embodiment of a method 1400 of decoding a variable page address with a page size bias , as in action 1330 of FIG. 13, in generating an entry select in translating virtual addresses of varying page sizes to physical addresses as in method 1100 in FIG. 11 and method 1200 in FIG. 12. Method 1400 begins and thereafter the variable page address that is received as in action 1320 in FIG. 13 is masked 1410 with the corresponding bits of the page size bias received in action 1310 in FIG. 13. In one embodiment, masking 1410 is accomplished by AND'ing the values. For example, if the page size bias is six bits wide, the page size bias will be AND'ed with the lower six bits of the variable page address. Thereafter, the result of the masking in action 1410 is hashed with the next set of upper bits in the variable page address immediately adjacent to the bits in the variable page address masked in action 1410. In one embodiment, the hashing 1420 is an XOR function in which the result is subsequently decoded into entry selects for accessing arrays. Thereafter, the method 1400 ends. For other embodiments of this function, please see the discussion in conjunction with FIG. 8.

Figure 15:
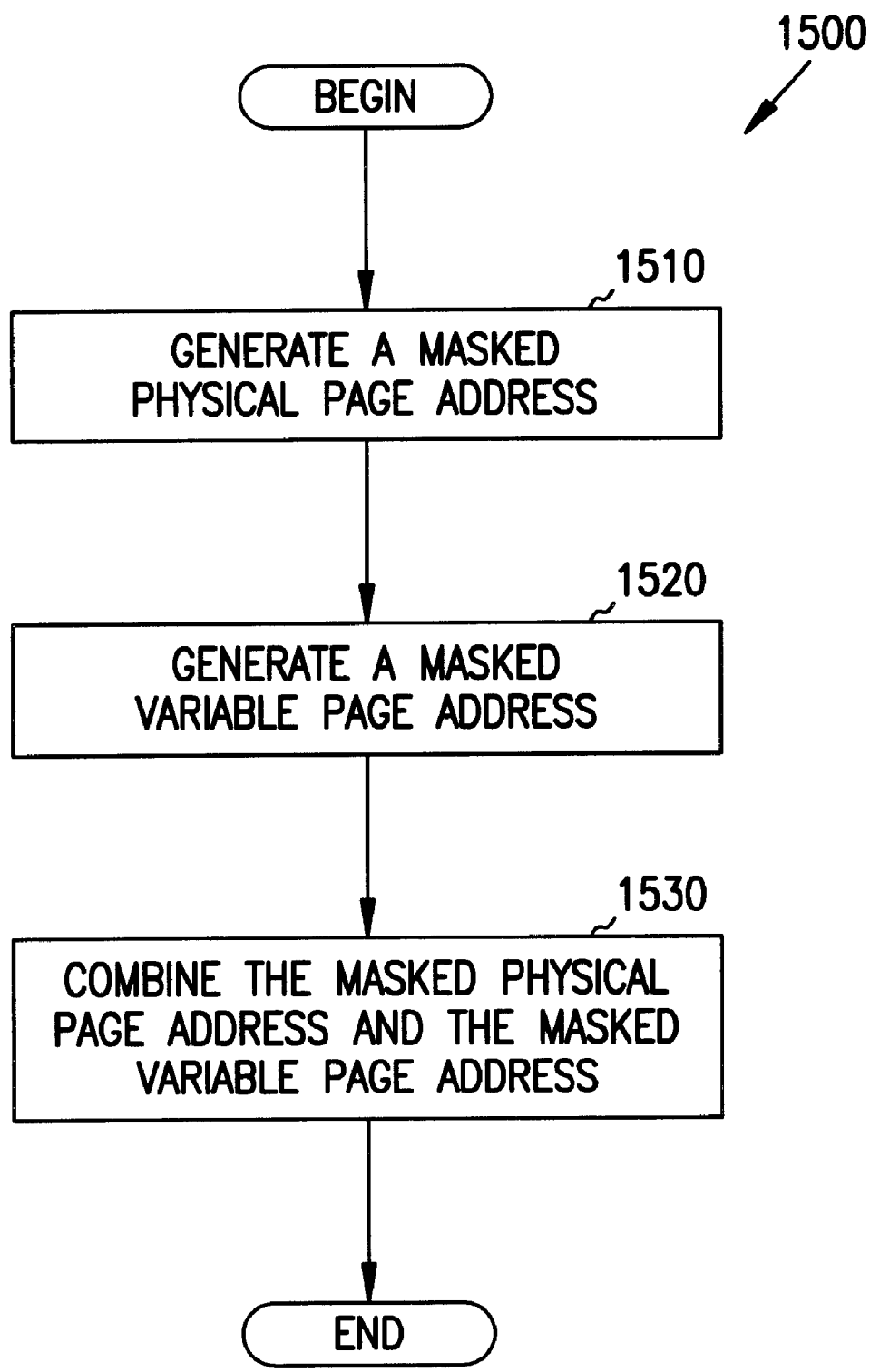
FIG. 15 is a block diagram of one embodiment of a method of generating a physical page address in translating virtual addresses of varying page sizes to physical addresses.

FIG. 15 is a block diagram of one embodiment of a method 1500 of generating a physical page address as in action 1120 in FIG. 11 and action 1220 in FIG. 12. In general, a physical page address is generated by combining a portion of the physical page address contained within the translation buffer with a portion of the variable page address input as indicated by the page size contained within the translation buffer. More specifically, the lower portion of the physical page address contained within the translation buffer is masked off according to the page size contained within the translation buffer to the extent that those bits which would be considered offset within the page (as opposed to the address of the page within memory space) are masked. Those masked bits are then replaced with the corresponding bits of the variable page address input to generate the physical page address output.

The method 1500 begins and thereafter, a masked physical page address is generated 1510 by masking a translation buffer entry physical page address with the corresponding translation buffer page mask, where a page mask is a decoded version of the page size which when used as a mask will cause address bits below the indicated page size to be masked and have no effect upon address bits above the indicated page size. The translation buffer physical page address and page mask are identified using an entry select as generated in action 1120 of FIG. 11, or action 1220 of FIG. 12, or more specifically as generated in action 1330 of FIG. 13. Thereafter, a masked variable page address is generated by masking the input variable page address with an inverted (bit wise) form of the identified page mask. Actions 1510 and 1520 yield a set of complementary page address bits such that the combination of said address bits will yield a complete physical page address. Therefore, in action 1530, the masked physical page address yielded by action 1510 and the masked variable page address yielded by action 1520 are added together to yield the physical page address. Thereafter, the method 1500 ends. In another embodiment, action 1510 is performed after action 1520, but before action 1530.

In another embodiment the masked physical page address and masked variable page address are combined not using an add but using an OR function instead. In another embodiment, the translation buffer physical page address and variable page address are not masked and combined to form the physical page address, but instead, the page mask is used to control a multiplexer such that the portions of the translation buffer physical page address and the variable page address which would not have been masked as described earlier in the description of method 1500, are directly combined to form the physical page address (with the same result as if the previous embodiment were used).

Figure 16:
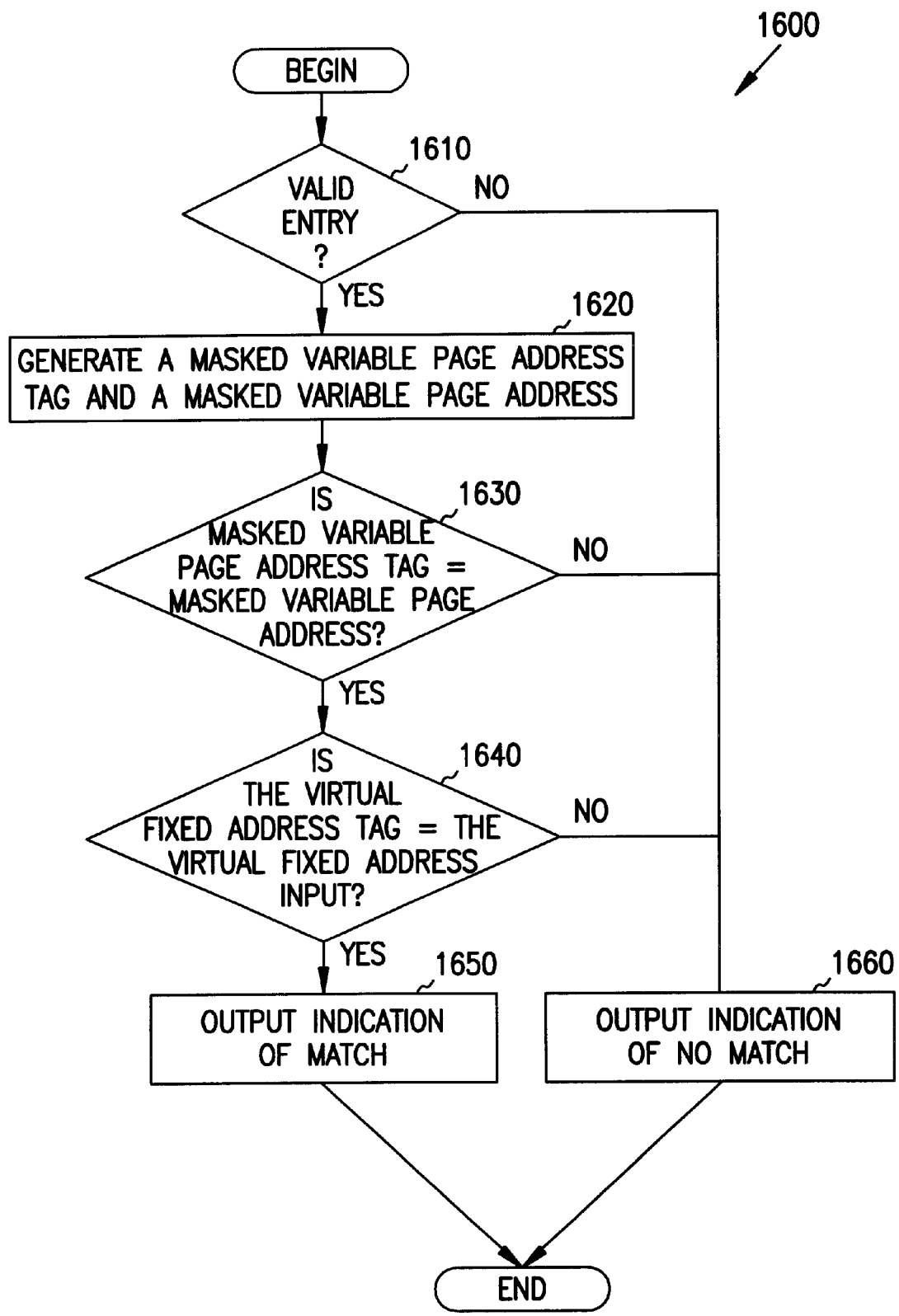
FIG. 16 is a block diagram of one embodiment of a method of generating an indication of a match in translating virtual addresses of varying page sizes to physical addresses.

FIG. 16 is a block diagram of one embodiment of a method 1600 of generating an indication of a match as in action 1130 in FIG. 11 and action 1230 in FIG. 12 in translating virtual addresses of varying page sizes to physical addresses. Method 1600 begins and thereafter, the entry in a second array is accessed using the entry select generated in action 1110 of FIG. 11 or in action 1210 of FIG. 12, or more specifically in action 1330 of FIG. 13. The portion of the entry that indicates validity of the entry is checked to verify that the entry is valid 1610. If the validity indicator indicates no validity, then an indication of no match is output 1620, and the method ends. Otherwise, if validity of the entry is indicated, then a masked variable page address tag is generated by masking the variable page address tag from the same entry with the page mask from the same entry, and a masked variable page address is generated by masking the variable page address input with the page mask from the same entry as the valid bit and variable page address tag selected 1630. If the comparison of the masked variable page address tag and the masked variable page address 1640 indicates inequality, then an indication of no match is output 1620, and the method ends. Otherwise, an entry in a first array is selected using the entry select generated in action 1110 of FIG. 11 or in action 1210 of FIG. 12, or more specifically in action 1330 of FIG. 13 to obtain a virtual fixed address tag. If a comparison of the virtual fixed address tag and the virtual fixed address input 1650 indicates inequality, then an indication of no match is output 1620, and the method ends. If none of the decision trees 1610, 1640, and 1650 cause an indication of no match to be output, then a match output will be generated 1660, and the method ends. In other embodiments, the decisions 1610, 1640, and 1650 may be performed in other orders or in parallel (but action 1630 must always take place before decision 1640).

CONCLUSION

A translation buffer has been described which can translate virtual to physical addresses of varying pages sizes quickly and with few misses. The translation buffer described uses an decoder which generates a hashed index into an array that maps a virtual page address to a physical page address using a page mask and maintains corresponding virtual fixed page address tags, and uses the same hashed index to access a second array which performs match comparisons using a variable page address tag, a page mask, and a valid flag. Together, the two arrays contain the entire virtual page address between the virtual fixed page address of the first array and the variable page address in the second, thus ensuring that the entire virtual page address will be used in determining whether a correct virtual to physical translation has ben performed. Furthermore, both arrays contain the page mask of the address to enable the address to be masked and combined properly in accordance with the page size.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. More specifically, the present invention has been described in terms of microprocessor terminology, however, the present invention can be embodied in software.

What is claimed is:

1. A computer system comprising:
   a processor;
   a physical memory operatively coupled to the processor having more than one page size identified with the physical memory;
   a direct-mapped translation buffer operatively coupled to the physical memory through an address bus, the direct-mapped translation buffer having a virtual memory address input associated with a virtual address, a page size bias input, and a physical memory address output, wherein the page size bias input comprises one or more lines corresponding to one or more positions of the virtual address, in a lower portion of a tag of the virtual address, that map a range of positions spanning a smallest page size to a largest page size of the more than one page size identified with the physical memory; and
   a page table operatively coupled to the direct-mapped translation buffer.

2. The computer system of claim 1, further comprising:
   a variable page address input line operatively coupled to the direct-mapped translation buffer; and
   a decoder operatively coupled to the page size bias input and the variable page address input line, the decoder having a first wordline select output line, wherein the decoder is capable of transmitting a first wordline selection through the first wordline select output line.

3. The computer system of claim 2, further comprising:
   a virtual fixed page address input line operatively coupled to the direct-mapped translation buffer.

4. The computer system of claim 3, further comprising:
   a physical memory page address output line operatively coupled to the direct-mapped translation buffer; and
   a first array operatively connected to the variable page address input line and the first wordline select output line, wherein the first array is capable of transmitting a corresponding physical memory page address through the physical page address output line and a virtual fixed page address through the virtual fixed page address output line, and wherein the first array is a random access memory array having the virtual fixed page address, a page mask, and the corresponding physical memory page address.

5. The computer system of claim 2, further comprising:
   a second array operatively connected to the variable page address input line and the first wordline select output line of the decoder, the second array having an entry including a virtual address tag, a flag indicating validity of the entry, and a page mask, wherein the second array is capable of transmitting an indication of a translation lookaside buffer (TLB) miss or a TLB hit through a TLB miss output line, and wherein the second array is a contents addressable memory array.

6. The computer system of claim 5, further comprising:
   a virtual fixed page address input line operatively coupled to the direct-mapped translation buffer; and
   a third array operatively connected to the virtual fixed page address input line, the third array having a third wordline select output line operatively connected to the second array, wherein the third array is capable of selecting the entry for possible invalidation, and wherein the third array is a contents addressable memory array.

7. A computer system comprising:
   a processor;
   a physical memory operatively coupled to the processor having more than one page size identified with the physical memory; and
   a translation buffer operatively coupled to the physical memory through an address bus,
      the translation buffer including:
         a virtual memory address input;
         a page size bias input;
         a physical memory address output;
   a variable page address input line operatively coupled to the address bus; and
   a decoder
      operatively coupled to
         the page size bias input and
         the variable page address input line,
      the decoder having a first wordline select output line,
      wherein the decoder outputs a first wordline selection through the first wordline select output line;
   a virtual fixed page address input line operatively coupled to the address bus;
   a physical memory page address output line;
   a virtual fixed page address output line;
   a TLB miss output line;
   a first array operatively connected to
      the variable page address input line and
      the first wordline select output line of the decoder,
      wherein the first array outputs
         a corresponding physical memory page address through the physical memory page address output line and
         a first virtual fixed page address through the virtual fixed page address output line;
   wherein the first array is a random access memory array and includes a plurality of entries comprising:
      the first virtual fixed page address,
      a page mask, and
      a corresponding physical memory page address; and
   a second array operatively connected to:
      the variable page address input line,
      the first wordline select output line of the decoder, and
      having a plurality of entries comprising:
         a second virtual address tag,
         a flag indicating validity of the entry included in the plurality of entries included in the second array, and
         a page mask
      wherein the second array outputs an indication of a translation lookaside buffer (TLB) miss or a TLB hit through the TLB miss output line;
   wherein the second array is a contents addressable memory array; and
   a third array operatively connected to the virtual fixed page address input line, having a third wordline select output line operatively connected to the second array, wherein the third array selects an entry included in the plurality of entries included in the second array for possible invalidation;
      wherein the third array is a contents addressable memory array.

8. A computer system comprising:
a processor;
a physical memory operatively coupled to the processor having more than one page size identified with the physical memory; and
a translation buffer operatively coupled to the physical memory through an address bus,
the translation buffer including:
  a virtual memory address input;
  a page size bias input;
  a physical memory address output;
  a variable page address input line operatively coupled to the address bus; and
  a decoder
    operatively coupled to
    the page size biased input, and
    the variable page address input line,
the decoder having a first wordline select output line,
  wherein, the decoder outputs a first wordline selection through the first wordline select output line;
  a virtual fixed page address input line operatively coupled to the address bus;
  a physical memory page address output line;
  a virtual fixed page address output line;
  a TLB miss output line;
  a first array operatively connected to
    the variable page address input line and
    the first wordline select output line of the decoder,
    wherein the first array outputs
      the corresponding physical memory page address through the physical memory page address output line and
      a first virtual fixed page address through the virtual fixed page address output line, and
      wherein the first array is a direct-mapped array;
  a second array operatively connected to:
    the variable page address input line,
    the first wordline select output line of the decoder, and
    having a plurality of entries comprising:
      a second virtual address tag,
      a flag indicating validity of the entry included in the plurality of entries included in the second array, and
      a page mask,
    wherein the second array outputs an indication of a translation lookaside buffer (TLB) miss or a TLB hit through the TLB miss output line;
    wherein the second array is a contents addressable memory array; and
  a third array operatively connected to the virtual fixed page address input line, having a third wordline select output line operatively connected to the second array, wherein the third array selects an entry included in the plurality of entries included in the second array for possible invalidation;
wherein the second array is a direct-mapped array.

* * * * *